(12) United States Patent
Yang

(10) Patent No.: US 10,942,296 B2
(45) Date of Patent: Mar. 9, 2021

(54) COVER PLATE PROCESSING METHOD, CONTROL APPARATUS, PROCESSING APPARATUS, AND STORAGE MEDIUM

(71) Applicant: WUHAN CHINA STAR OPTOELECTRONICS TECHNOLOGY CO., LTD., Hubei (CN)

(72) Inventor: Yong Yang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 247 days.

(21) Appl. No.: 16/057,270

(22) Filed: Aug. 7, 2018

(65) Prior Publication Data

US 2019/0302315 A1 Oct. 3, 2019

(30) Foreign Application Priority Data

Mar. 30, 2018 (CN) .......................... 201810289813.5

(51) Int. Cl.
*G02B 1/12* (2006.01)
*G02B 1/18* (2015.01)
(Continued)

(52) U.S. Cl.
CPC ................ *G02B 1/12* (2013.01); *C03C 15/00* (2013.01); *G02B 1/11* (2013.01); *G02B 1/18* (2015.01); *G02B 27/48* (2013.01); *G06F 17/14* (2013.01)

(58) Field of Classification Search
None
See application file for complete search history.

(56) References Cited

U.S. PATENT DOCUMENTS

2008/0266574 A1\* 10/2008 Groot ................ G01B 9/02057
356/511
2014/0356605 A1\* 12/2014 Adib ...................... C03C 3/097
428/220

(Continued)

FOREIGN PATENT DOCUMENTS

CN 102609930 A 7/2012
CN 104574324 A 4/2015
(Continued)

*Primary Examiner* — Stephanie P Duclair

(57) ABSTRACT

The present invention provides a processing method of a cover plate, a control apparatus, a cover plate processing apparatus, and a storage medium. The processing method utilizes a scanning device to scan surfaces and obtain surface features of a first cover plate and a second cover plate, and performs Fourier transformation on the surface features of the first cover plate and the second cover plate to obtain the surface feature frequency variation distribution curves of the first cover plate and the second cover plate, thereby to obtain the surface feature frequency variation distribution curves of a high-resolution cover plate. Fourier inverse transformation is performed on the surface feature frequency variation distribution curves of the high-resolution cover plate to obtain surface features of a target cover plate, so that the high-resolution cover plate so processed meets balancing speckles and anti-glare requirements.

7 Claims, 3 Drawing Sheets

(51) Int. Cl.
*C03C 15/00* (2006.01)
*G02B 1/11* (2015.01)
*G02B 27/48* (2006.01)
*G06F 17/18* (2006.01)
*G02B 5/02* (2006.01)
*G02B 27/00* (2006.01)
*G02F 1/1333* (2006.01)
*G06F 17/14* (2006.01)

(56) References Cited

U.S. PATENT DOCUMENTS

2016/0189349 A1 6/2016 Zhang et al.
2016/0266366 A1 9/2016 Chung et al.
2016/0357294 A1* 12/2016 Ozeki ...................... B32B 3/02

FOREIGN PATENT DOCUMENTS

| CN | 105938268 A | 9/2016 |
| CN | 106656106 A | 5/2017 |
| CN | 106910511 A | 6/2017 |
| CN | 107407799 A | 11/2017 |
| KR | 20070074293 A | 7/2007 |

* cited by examiner

COVER PLATE PROCESSING METHOD, CONTROL APPARATUS, PROCESSING APPARATUS, AND STORAGE MEDIUM

CROSS REFERENCE TO RELATED APPLICATIONS

This application claims the priority of China Patent Application serial No. 201810289813.5, filed Mar. 30, 2018, the disclosures of which are incorporated herein by reference in its entirety.

BACKGROUND OF INVENTION

1. Field of Invention

The present invention relates to a display field, and particularly to a processing method of a cover plate, a control apparatus, a processing apparatus of the cover plate, and a storage medium.

2. Related Art

Liquid crystal displays (LCDs) are display products that are most widely used in current markets, and are manufactured with quite mature manufacturing processes, high product yield, relatively low manufacturing cost, and have gained high market acceptance. Thin film transistor-liquid crystal displays (TFT-LCDs) have been developed for years, and manufacturing processes thereof are skillful and mature.

Presently, users are annoyed by ambient light when using mobile phones in a high brightness environment. To overcome the problem, in prior art, a specific surface treatment is carried out on a surface of a cover plate or a polarizing plate of a display panel to reduce glare and reflection on the surface of the display panel, and therefore to improve reading comfort and readability. However, anti-glare surface treatment commonly used on the surface of the cover plate is likely to render display quality of a high-resolution panel vague, and even cause flashing resulting from bright and dark changes, which is so called speckles.

Currently, cover plates are usually processed in a physical manner, and therefore occurrence of speckles cannot be completely prevented. As a result of failure to reach a balance among anti-glare, anti-reflection, and speckles of display panels, such cover plates are less used in high resolution display panels, and thereby are not beneficial to promotion and application of small sized panels.

SUMMARY OF INVENTION

Accordingly, an object of the present invention is to provide a processing method of a cover plate, a control apparatus, a cover plate processing apparatus, and a storage medium.

To achieve the above-mentioned object, the processing method of the present invention comprises: scanning, by operating a scanning device, surfaces of a first cover plate and a second cover plate to obtain surface features of the first cover plate and the second cover plate; obtaining surface feature frequency variation distribution curves of the first cover plate and the second cover plate according to the surface features of the first cover plate and the second cover plate; obtaining a surface feature frequency distribution curve of a target cover plate according to the surface feature frequency variation distribution curves of the first cover plate and the second cover plate; and obtaining surface features of the target cover plate according to the surface feature frequency distribution curve of the target cover plate.

In one aspect of the present invention, the obtaining surface feature frequency variation distribution curves of the first cover plate and the second cover plate according to the surface features of the first cover plate and the second cover plate comprises: performing Fourier transformation on the surface features of the first cover plate and the second cover plate to obtain the surface feature frequency variation distribution curves of the first cover plate and the second cover plate.

The obtaining surface features of the target cover plat according to the surface feature frequency distribution curve of the target cover plate comprises: performing Fourier inverse transformation on the surface feature frequency distribution curve of the target cover plate to obtain the surface features of the target cover plate.

In another aspect of the present invention, the obtaining a surface feature frequency distribution curve of a target cover according to the surface feature frequency variation distribution curves of the first cover plate and the second cover plate comprises: obtaining a highest point of the surface feature frequency variation distribution curve of the first cover plate according to the surface feature frequency variation distribution curve of the first cover plate; obtaining a highest point of the surface feature frequency variation distribution curve of the second cover plate according to the surface feature frequency variation distribution curve of the second cover plate; obtaining a midpoint of a connecting line interconnecting the highest points of the surface feature frequency variation distribution curves of the first cover plate and the second cover plate; and moving entirely the surface feature frequency variation distribution curve of the first cover plate to allow the highest point of the surface feature frequency variation distribution curve of the first cover plate to overlap the midpoint, thereby to obtain the surface feature frequency distribution curve of the target cover plate.

In another aspect of the present invention, the processing method further comprises: operating a processing apparatus to process the target cover plate according to the surface features of the target cover plate, thereby to obtain the target cover plate so processed.

In another aspect of the present invention, the processing apparatus is an etching equipment for performing an etching process.

In another aspect of the present invention, the operating a processing apparatus to process the target cover plate according to the surface features of the target cover plate comprises: performing, by operating the processing apparatus, an anti-glare surface treatment on the target cover plate according to the surface features of the target cover plate; performing, by operating the processing apparatus, an anti-reflection surface treatment on the target cover plate according to the surface features of the target cover plate; and performing, by operating the processing apparatus, an anti-fingerprint surface treatment on the target cover plate according to the surface features of the target cover plate.

In another aspect of the present invention, the anti-glare surface treatment is performed with an acidic solution on a surface of the target cover plate, the anti-reflection surface treatment is performed by depositing at least two reflection layers on the surface of the target cover plate, and the anti-fingerprint surface treatment is performed by coating a hydrophobic organic layer on the surface of the target cover plate.

The present invention further provides a control apparatus provided to execute a plurality of instructions stored in a memory unit to carry out the processing method as described above.

The present invention further provides a cover plate processing apparatus comprising the control apparatus and the memory unit as described above.

The present invention further provides a storage medium storing a plurality of instructions, wherein the plurality of instructions are provided for a control apparatus to carry out the processing method as described above.

The advantages of the present invention are as follows: the processing method utilizes a scanning device to scan surfaces and obtain surface features of the first cover plate and the second cover plate, and perform Fourier transformation on the surface features to obtain the surface feature frequency variation distribution curves of the first cover plate and the second cover plate, thereby to obtain the surface feature frequency variation distribution curves of a high-resolution cover plate. Perform Fourier inverse transformation on the surface feature frequency variation distribution curves of the high-resolution cover plate to obtain surface features of the target cover plate, so that the high-resolution cover plate so processed meets the requirements of balancing speckles and anti-glare.

DESCRIPTION OF PREFERRED EMBODIMENTS

Figure 1:
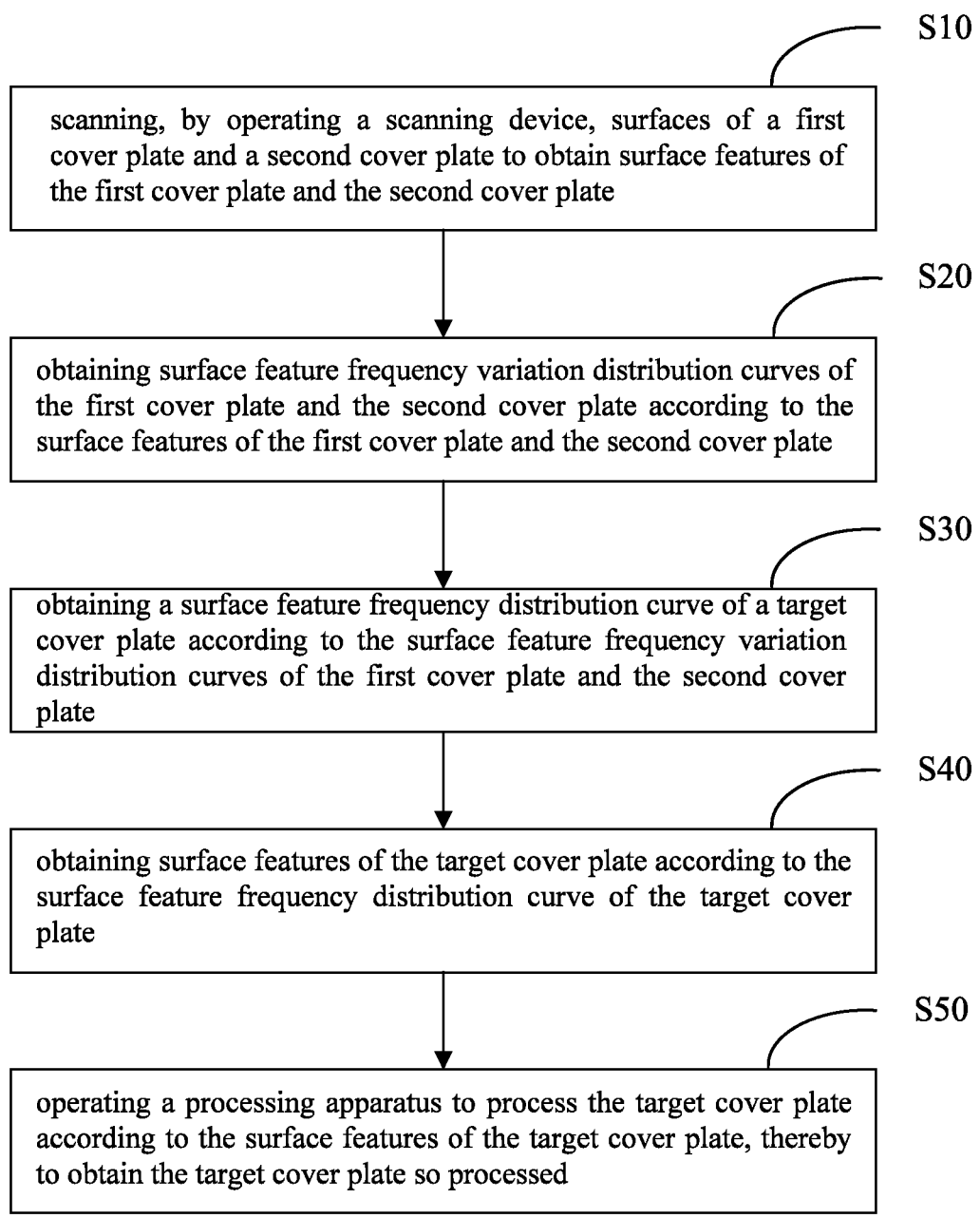
FIG. 1 is a flowchart of a processing method of a cover plate in accordance with an embodiment of the present invention.

The following embodiments are referring to the accompanying drawings for exemplifying specific implementable embodiments of the present disclosure. Furthermore, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto. In the drawings, elements with similar structures are labeled with like reference numerals.

FIG. 1 shows a flowchart of a processing method of a cover plate in accordance with an embodiment of the present invention.

The processing method of the cover plate comprises a step S10: scanning, by operating a scanning device, surfaces of a first cover plate and a second cover plate to obtain surface features of the first cover plate and the second cover plate. In the preferable embodiment, the first cover plate is a white glass cover plate having less speckles and high definition. The second cover plate is a general anti-glare cover plate having better anti-glare performance but more speckles.

The step S10 is carried out by operating a 3D microscope to scan surfaces of the first cover plate and the second cover plate to obtain surface features of the first cover plate and the second cover plate. The surface features mainly contain shape, size, and arrangement of surface particles of the first cover plate and the second cover plate. Different surface features of cover plates exhibit different functions.

Step S20: obtaining surface feature frequency variation distribution curves of the first cover plate and the second cover plate according to the surface features of the first cover plate and the second cover plate.

Figure 2:
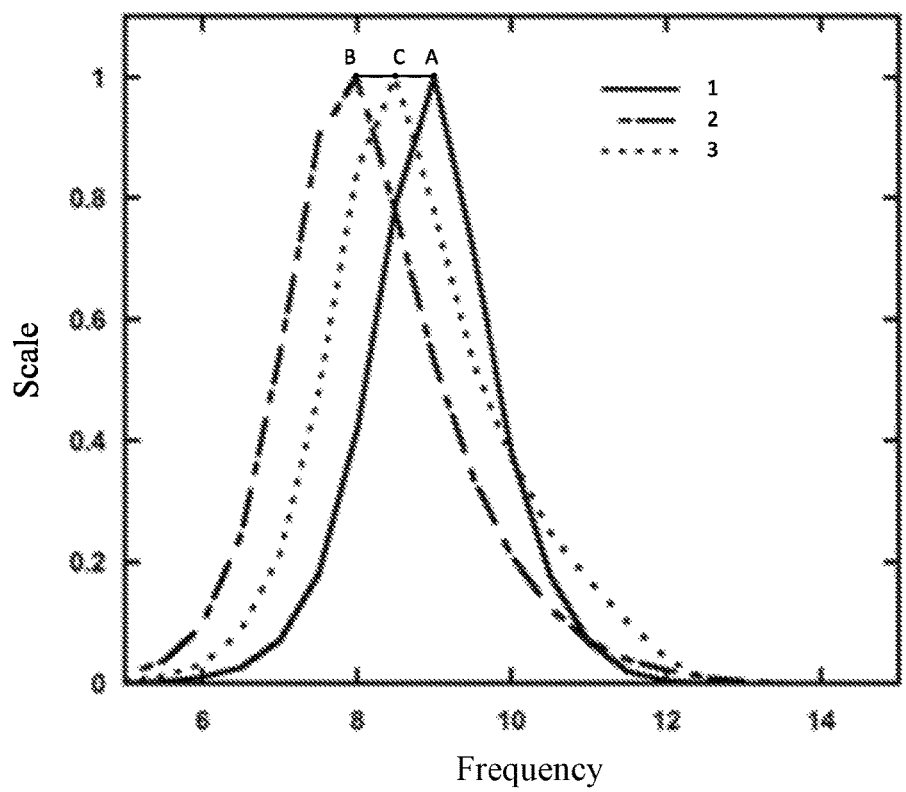
FIG. 2 is a schematic view showing surface feature frequency variation distribution curves of a first cover plate, a second cover plate, and a target cover plate of the processing method in accordance with an embodiment of the present invention.

In the step S20, first, performing Fourier transformation on the surface features of the first cover plate and the second cover plate to covert one of the shape, size, and arrangement of surface particles of the first cover plate and the second cover plate into grayscales of images, thereby to calculate frequency and occupied proportion of one of the grayscales occurring in an image. As shown in FIG. 2, one of the surface features is illustrated for description. Fourier transformation is performed on the size (i.e. distribution of concave and convex surfaces) of surface particles of the first cover plate and the second cover plate. Curve 1 is a surface feature frequency variation distribution curve of the first cover plate, and curve 2 is a surface feature frequency variation distribution curve of the second cover plate.

Step S30: obtaining a surface feature frequency distribution curve of a target cover according to the surface feature frequency variation distribution curves of the first cover plate and the second cover plate.

As shown in FIG. 2, in this step, first, obtain a highest point A of the surface feature frequency variation distribution curve of the first cover plate according to the surface feature frequency variation distribution curve of the first cover plate; second, obtain a highest point B of the surface feature frequency variation distribution curve of the second cover plate according to the surface feature frequency variation distribution curve of the second cover plate; then, obtain a midpoint C of a connecting line interconnecting the highest points A and B of the surface feature frequency variation distribution curves of the first cover plate and the second cover plate; and finally, move entirely the surface feature frequency variation distribution curve of the first cover plate to allow the highest point of the surface feature frequency variation distribution curve of the first cover plate to overlap the midpoint, thereby to obtain the surface feature frequency distribution curve 3 of the target cover plate. That is, curve 3 is the surface feature frequency distribution curve which meets the requirement of the present invention.

Step S40: obtaining surface features of the target cover plate according to the surface feature frequency distribution curve of the target cover plate.

In the step S40, performing Fourier inverse transformation on the surface feature frequency distribution curve of the target cover plate. The step S40 is carried out with a professional program used in the industry to obtain distribution of surface particles size of the target cover plate. The other surface features of the target cover plate are capable of being obtained in turn by repeatedly performing the above-mentioned steps.

Furthermore, all of the surface features of the first cover plate and the second cover plate are capable of being performed with Fourier transformation at the same time in order to save more time than the time spent obtaining the surface features in turn as described previously, but with larger calculation amount and more complicated formulas.

The processing method of a cover plate of the present invention further comprises: step S50: operating a processing apparatus to process the target cover plate according to the surface features of the target cover plate, thereby to obtain the target cover plate so processed.

In the step S50, the target cover plate is mainly processed accordingly to a series of surface features of the target cover plate so processed to meet requirements of the present invention. Specifically, the processing apparatus is etching equipment for performing an etching process, wherein the etching process can be wet etching or dry etching.

In the embodiment of the present invention, an optimal particle size range of the particles of cover plates is 3-5 um according to the surface features obtained in the step S40. According to factors of particle size, aspect ratios, and glass material of cover plates, the present invention utilizes wet etching to process the surface of the target cover plate through three steps mainly comprising an anti-glare surface treatment, an anti-reflection surface treatment, and an anti-fingerprint surface treatment.

(1) Anti-glare surface treatment is performed with mixed acid taking hydrofluoric acid as a main material to process the target cover plate; wherein the mass fraction of hydrofluoric acid is 5-10%, and the time for etching the target cover plate is 30-60 minutes. Furthermore, because of tension effect of acid liquid on the cover plate, a pit microstructure similar to spherical shape is formed on the target cover plate. A particle size range of the microstructure is 2.8-4.5 urn, and the particle size matches the optimal particle size of the theoretical calculation. A height range of the microstructure is 0.3-0.1 um, and an aspect ratio thereof is 0.1 or so.

(2) Anti-reflection surface treatment is performed by sputtering and the like to deposit a film layer of an alternate structure having 4 to 6 layers on the surface of the target cover plate, and to reduce reflectivity of the surface of the cove plate though light interference cancellation principle; wherein the reflective film layer is made of niobium pentoxide and silicon dioxide, and each of the layers has a thickness between 20-100 nm.

(3) An anti-fingerprint surface treatment is performed firstly to coat an organic coating layer with hydrophobic function. The organic coating layer with hydrophobic function is mainly utilized for anti-fouling and is formed with simple processes.

Furthermore, the anti-glare surface treatment is also capable of being performed on the target cover plate by photoetching. Namely, prior to photoetching, prepare a mask plate corresponding to the surface features of the target cover plate according to the surface features of the target cove plate, and then prepare a surface profile corresponding the mask plate on a surface of the glass cover plate through developing etching; wherein the photoetching precision is 1 um, and a microstructure of 3-5 μm is formed on the surface of the target cover plate through the photoetching process. Processes of follow-up anti-reflection surface treatment and anti-fingerprint surface treatment are the same as that of the wet etching.

The present invention provides a processing method of a cover plate which utilizes a scanning device to scan surfaces and to obtain surface features of the first cover plate and the second cover plate, and perform Fourier transformation on the surface features of the first cover plate and the second cover plate to obtain the surface feature frequency variation distribution curves of the first cover plate and the second cover plate, thereby to obtain the surface feature frequency variation distribution curves of high resolution cover plates. Perform Fourier inverse transformation on the surface feature frequency variation distribution curves of the high-resolution cover plates to obtain surface features of the target cover plate, so that the high-resolution cover plate so processed meets the requirements of balancing speckles and anti-glare.

Figure 3:
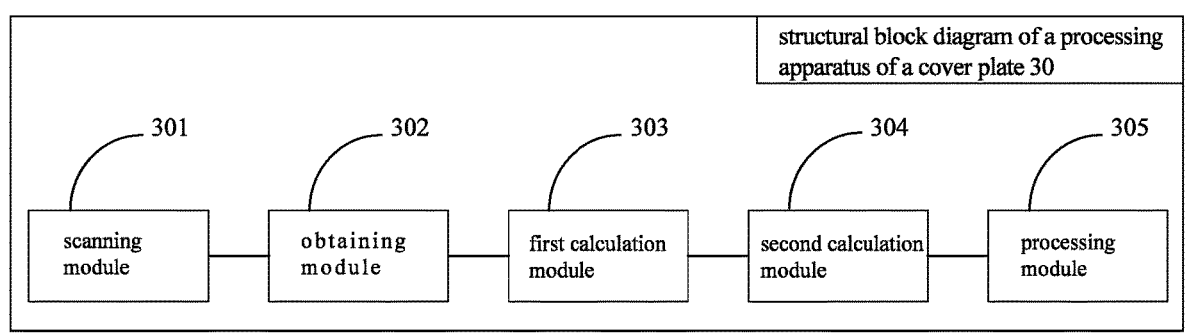
FIG. 3 is a structural block diagram of a processing apparatus of a cover plate in accordance with an embodiment of the present invention.

FIG. 3 is a structural block diagram of a processing apparatus of a cover plate of the present invention. The processing apparatus 30 of the cover plate comprises a scanning module 301, an obtaining module 302, a first calculation module 303, a second calculation module 304, and a processing module 305.

The scanning module 301 is utilized to scan surfaces of the first cover plate and the second cover plate to obtain surface features of the first cover plate and the second cover plate.

The obtaining module 302 is utilized to obtain surface feature frequency variation distribution curves of the first cover plate and the second cover plate according to the surface features of the first cover plate and the second cover plate.

The first calculation module 303 is utilized to obtain a surface feature frequency distribution curve of a target cover according to the surface feature frequency variation distribution curves of the first cover plate and the second cover plate.

The second calculation module 304 is utilized to obtain surface features of the target cover plate according to the surface feature frequency distribution curve of the target cover plate.

The processing module 305 is utilized to operate a processing apparatus to process the target cover plate according to the surface features of the target cover plate, thereby to obtain the target cover plate so processed.

Figure 4:
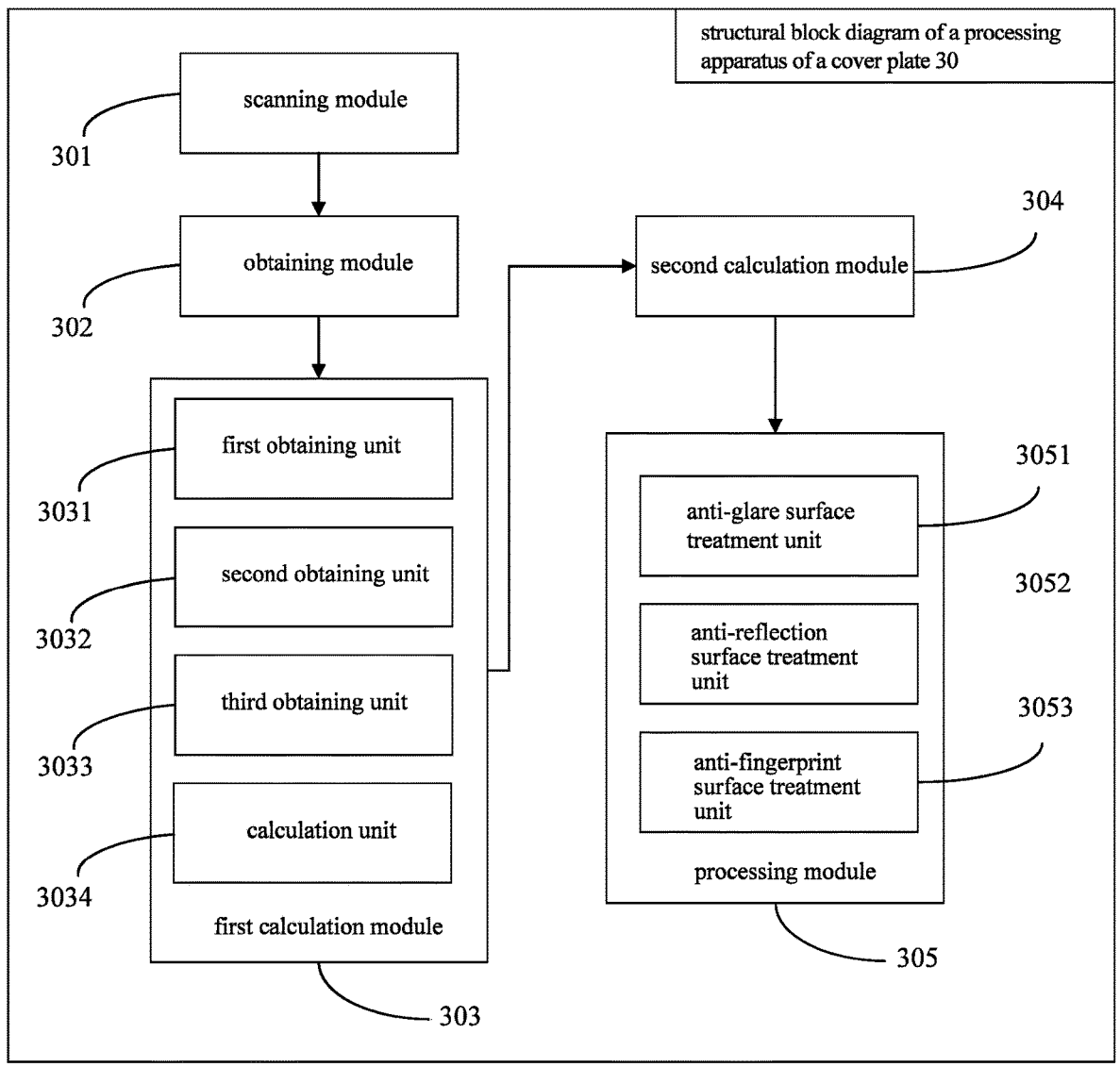
FIG. 4 is a structural block diagram of a processing apparatus of a cover plate in accordance with another embodiment of the present invention.

As shown in FIG. 4, the calculation module 303 comprises a first obtaining unit 3031, a second obtaining unit 3032, a third obtaining unit 3033, and a calculation unit 3034.

The first obtaining unit 3031 is utilized to obtain a highest point of the surface feature frequency variation distribution curve of the first cover plate according to the surface feature frequency variation distribution curve of the first cover plate.

The second obtaining unit 3032 is utilized to obtain a highest point of the surface feature frequency variation distribution curve of the second cover plate according to the surface feature frequency variation distribution curve of the second cover plate.

The third obtaining unit 3033 is utilized to obtain a midpoint of a connecting line interconnecting the highest points of the surface feature frequency variation distribution curves of the first cover plate and the second cover plate.

The calculation unit 3034 is utilized to move entirely the surface feature frequency variation distribution curve of the first cover plate to allow the highest point of the surface feature frequency variation distribution curve of the first cover plate to overlap the midpoint, thereby to obtain the surface feature frequency distribution curve of the target cover plate.

As shown in FIG. 4, the processing module 305 comprises an anti-glare surface treatment unit 3051, an anti-reflection surface treatment unit 3052, and an anti-fingerprint surface treatment unit 3053.

The anti-glare surface treatment unit 3051 is utilized to perform an anti-glare surface treatment on the target cover plate according to the surface features of the target cover plate and is performed with an acidic solution on a surface of the target cover plate.

The anti-reflection surface treatment unit 3052 is utilized to perform an anti-reflection surface treatment on the target cover plate according to the surface features of the target cover plate and is performed by depositing multiple reflection layers on the surface of the target cover plate.

The anti-fingerprint surface treatment unit 3053 is utilized to perform an anti-fingerprint surface treatment on the target cover plate according to the surface features of the target cover plate and is performed by coating a hydrophobic organic layer on the surface of the target cover plate.

The processing apparatus of the present invention comprises the scanning module utilized to scan surfaces of the first cover plate and the second cover plate to obtain surface features of the first cover plate and the second cover plate; the obtaining module is utilized to obtain surface feature frequency variation distribution curves of the first cover plate and the second cover plate according to the surface features of the first cover plate and the second cover plate; the first calculation module is utilized to obtain a surface feature frequency distribution curve of a target cover according to the surface feature frequency variation distribution curves of the first cover plate and the second cover plate; the second calculation module is utilized to obtain surface features of the target cover plate according to the surface feature frequency distribution curve of the target cover plate; the processing module is utilized to operate a processing apparatus to process the target cover plate according to the surface features of the target cover plate, thereby to obtain the target cover plate so processed; and perform Fourier transformation and inverse transformation on surface features of the first cover plate and the second cover plate to obtain surface features of the target cover plate, whereby the high resolution cover plate so processed meets the requirements of balancing speckles and anti-glare.

The present invention further provides a control apparatus to execute a plurality of instructions stored in a memory unit to carry out the processing method as described above.

The present invention further provides a cover plate processing apparatus comprising the control apparatus and the memory unit.

The present invention further provides a storage medium readable by computer. The storage medium stores the plurality of instructions to allow the computer to carry out the processing method as described above.

It is understood that the invention may be embodied in other forms within the scope of the claims. Thus the present examples and embodiments are to be considered in all respects as illustrative, and not restrictive, of the invention defined by the claims.

What is claimed is:

1. A processing method of a cover plate, comprising:
    scanning, by operating a scanning device, surfaces of a first cover plate and a second cover plate to obtain surface features of the first cover plate and the second cover plate;
    obtaining, by performing Fourier transformation on the surface features of the first cover plate and the second cover plate, surface feature frequency variation distribution curves of the first cover plate and the second cover plate according to the surface features of the first cover plate and the second cover plate;
    obtaining a surface feature frequency distribution curve of a target cover plate according to the surface feature frequency variation distribution curves of the first cover plate and the second cover plate; and
    obtaining, by performing Fourier inverse transformation on the surface feature frequency distribution curve of the target cover plate, surface features of the target cover plate according to the surface feature frequency distribution curve of the target cover plate.

2. The processing method of claim 1, further comprising: operating a processing apparatus to process the target cover plate according to the surface features of the target cover plate.

3. The processing method of claim 2, wherein the processing apparatus is an etching equipment for performing an etching process.

4. The processing method of claim 2, wherein the operating a processing apparatus to process the target cover plate according to the surface features of the target cover plate comprises:
    performing, by operating the processing apparatus, an anti-glare surface treatment on the target cover plate according to the surface features of the target cover plate;
    performing, by operating the processing apparatus, an anti-reflection surface treatment on the target cover plate according to the surface features of the target cover plate; and
    performing, by operating the processing apparatus, an anti-fingerprint surface treatment on the target cover plate according to the surface features of the target cover plate.

5. The processing method of claim 4, wherein the anti-glare surface treatment is performed with an acidic solution on a surface of the target cover plate, the anti-reflection surface treatment is performed by depositing at least two reflection layers on the surface of the target cover plate, and the anti-fingerprint surface treatment is performed by coating a hydrophobic organic layer on the surface of the target cover plate.

6. A processing method of a cover plate, comprising:
    scanning, by operating a scanning device, surfaces of a first cover plate and a second cover plate to obtain surface features of the first cover plate and the second cover plate;
    obtaining surface feature frequency variation distribution curves of the first cover plate and the second cover plate according to the surface features of the first cover plate and the second cover plate;
    obtaining a surface feature frequency distribution curve of a target cover plate according to the surface feature frequency variation distribution curves of the first cover plate and the second cover plate; and
    obtaining surface features of the target cover plate according to the surface feature frequency distribution curve of the target cover plate;
    wherein the obtaining a surface feature frequency distribution curve of a target cover plate according to the surface feature frequency variation distribution curves of the first cover plate and the second cover plate comprises:
        obtaining a highest point of the surface feature frequency variation distribution curve of the first cover plate according to the surface feature frequency variation distribution curve of the first cover plate;
        obtaining a highest point of the surface feature frequency variation distribution curve of the second cover plate according to the surface feature frequency variation distribution curve of the second cover plate;
        obtaining a midpoint of a connecting line interconnecting the highest points of the surface feature frequency variation distribution curves of the first cover plate and the second cover plate; and moving entirely the surface feature frequency variation distribution curve of the first cover plate to allow the highest point of the surface feature frequency variation distribution curve of the first cover plate to overlap the midpoint, thereby to obtain the surface feature frequency distribution curve of the target cover plate.

7. The processing method of claim 6, further comprising:
operating a processing apparatus to process the target cover plate according to the surface features of the target cover plate.

\* \* \* \* \*